United States Patent [19]

McWhorter

[11] 4,051,195
[45] Sept. 27, 1977

[54] POLYEPOXIDE-POLYACRYLATE ESTER COMPOSITIONS

[75] Inventor: Wayne F. McWhorter, Louisville, Ky.

[73] Assignee: Celanese Polymer Specialties Company, Louisville, Ky.

[21] Appl. No.: 640,674

[22] Filed: Dec. 15, 1975

[51] Int. Cl.$^2$ .............................................. C08L 63/00
[52] U.S. Cl. .................................. 260/837 R; 260/836
[58] Field of Search ................................ 260/836, 837

[56] References Cited

U.S. PATENT DOCUMENTS

| 3,551,235 | 12/1970 | Bassemir | 260/836 |
|---|---|---|---|
| 3,551,246 | 12/1970 | Bassemir | 260/836 |
| 3,551,311 | 12/1970 | Bassemir | 260/836 |
| 3,558,387 | 1/1971 | Bassemir | 260/836 |
| 3,637,618 | 1/1972 | May | 260/836 |
| 3,876,518 | 4/1975 | Borden | 204/159.14 |
| 3,925,349 | 12/1975 | Gaske | 204/159.15 |
| 3,931,075 | 1/1976 | Trecker | 260/23 EP |
| 3,989,610 | 11/1976 | Tsukada | 260/837 R |

OTHER PUBLICATIONS

Lee et al., Handbook of Epoxy Resins, McGraw-Hill Book Co., New York, 1967, pp. 7-1 to 7-15.

*Primary Examiner*—Paul Lieberman
*Attorney, Agent, or Firm*—Herbert P. Price; K. A. Genoni; T. J. Morgan

[57] ABSTRACT

Curable compositions are made from a blend of an epoxide resin and a polyacrylate or polymethacrylate ester. Such compositions cure rapidly even at low temperatures when mixed with aliphatic polyamines and are useful in coating and adhesive applications.

9 Claims, No Drawings

POLYEPOXIDE-POLYACRYLATE ESTER COMPOSITIONS

BACKGROUND OF THE INVENTION

The field of art to which this invention pertains is synthetic resins obtained by the reaction of compounds containing more than one epoxy group with curing agents, particularly aliphatic amine curing agents.

Epoxide resins are well known compositions which have found a wide variety of uses and which have been reacted with a wide variety of curing agents to form cured compositions. Very useful curing agents are aliphatic amines. However, in some applications, epoxide resins cured with aliphatic amines are lacking in some desirable properties. Epoxide resin/aliphatic amine systems are deficient in low temperature cure response in that such system do not cure satisfactorily at temperatures below 40° F. Also, such systems, especially at low temperatures, are viscous and do not properly wet to substrate to which they are applied. In addition coating made from epoxide resin/aliphatic amine curable compositions, when cured at room temperature under atmospheric conditions, often have greasy uneven surfaces. Finally, such systems, particularly in large masses, will undergo exothermic reactions which are difficult to control.

U.S. Pat. No. 3,383,434 discloses a curable system made from a diepoxide resin, an unsaturated polyester and a polyamine which has two primary amine groups. According to the patent, the disclosed system will react rapidly at low temperatures to give thermoset resins. The amine reacts with the C=C bond contained in the polyester as well as with the epoxy groups to form a complex cross-linked resin. Such systems are said to have short gel times and low peak exotherms. However, such systems are viscous and exhibit poor wetting properties.

U.S. Pat. No. 2,548,447 describes cold-setting adhesives made from expoxide resins diluted with a cyano-substituted hydrocarbon cured with a polyamine. Acetonitrile is the preferred diluent although acrylonitrile and methacrylonitrile are disclosed as being useful. Acrylonitrile and methacrylonitrile are monofunctional and volatile.

U.S. Pat. No. 2,939,859 discloses curable compositions made from a polyepoxide resin, sytrene and an epoxide resin curing agent plus, preferably, a peroxide catalyst. Styrene is monofunctional and volatile.

SUMMARY OF THE INVENTION

This invention pertains to curable epoxide resin compositions. In particular this invention relates to epoxide resins cured with aliphatic polyamines. More particularly, this invention relates to epoxides resin/polyacrylate ester or polymethyacrylate ester compositions.

The curable composition of this invention is a blend of an epoxide resin, which contains more than one 1,2 epoxy group per molecule, and a polyacrylate or polymethacrylate ester of a polyol wherein said ester contains more than one terminal acrylate or methacrylate group, the epoxide resin and the ester being present in the weight ratio of about 100 parts of epoxide resin to about 5 to about 100 parts of ester. The epoxide resin/-polyacrylate or polymethacrylate blend is cured with an aliphatic polyamine containing at least 3 amine hydrogen atoms per molecule in the amount of about 0.75 to about 1.25 amine hydrogen atoms for each epoxy group and each acrylic unsaturated group.

The curable compositions of this invention when rected with aliphatic polyamines will cure even in thin films at temperatures as low as 32° F. The compositions exhibit low exotherm temperatures. When drawn down as coatings, the compositions are less prone to form "sweatout" than similar coatings based on epoxide resins which do not contain the polyacrylate ester modification. The compositions of this invention have low viscosities and their excellent wetting characteristics are readily apparent, as evidenced by high bond strength, when applied in bondline thicknesses to metal, plastic, damp concrete and other difficult to wet substrates.

DESCRIPTION OF THE INVENTION

The epoxide resins useful in this invention are those resins which contain more than one 1,2-epoxy group per molecule. They can be saturated or unsaturated, aliphatic, cycloaliphatic or heterocyclic and can be monomeric or polymeric in nature. The weights per epoxide of such resins will be within the range of about 100 to about 2,000. Preferably, the epoxide resins will contain glycidyl ether or ester groups, will be liquid rather than solid and will have weight per epoxide in the range of about 110 to about 500, most preferably about 175 to about 250.

Useful epoxide resins are glycidyl polyethers of polyhydric phenols which are derived from an epihalohydrin, e.g., epichlorohydrin, and a polyhydric phenol. Examples of such polyhydric phenols include resorcinol, hydroquinone, bis(4-hydroxyphenyl)-2,2-propane, or bisphenol A as it is commonly called, 4,4'-dihydroxybenzophenone, bis (4-hydroxyphenyl)-1,1-ethane, bis(4-hydroxyphenyl)-1,1-isobutane, bis(4-hydroxyphenyl)2,2-butane, bis(2-dihydroxynaphthyl)methane, phloroglucinol, and bis(4-hydroxyphenyl)sulfone. Additional polyhydric phenols are novolac resins containing more than two phenol, or substituted phenol, moieties linked through methylene bridges as well as halogenated, e.g., brominated and chlorinated, phenolic compounds.

Additional epoxide resins are glycidyl polyethers of polyhydric alcohols prepared by reacting a polyhydric alcohol with an epihalohydrin using an acidic catalyst, e.g., boron trifluoride, and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanediol, hexanetriol, trimethylol propane, trimethylol ethane, pentaerythritol and the like.

Epoxide resins and their preparations are described in U.S. Pat. Nos. 2,467,171, 2,615,007, 2,615,008, 2,801,227, 2,538,072 and 2,033,803 which are herein incorporated be reference.

Other epoxide resins are glycidyl esters of polycarboxylic acids which are derived from an epihalohydrin and a polycarboxylic acid using procedures described in U.S. Pat. Nos. 3,859,314 and 3,576,827 which are herein incorporated by reference. Examples of polycarboxylic acids include phthalic acid or its anhydride, isophthalic acid, terephthalic acid, tetrahydrophthalic acid, hexahydrophthalic anhydride, adipic acid, dimerized fatty acids, dibasic acids made from an unsaturated fatty acid and acrylic acid and acrylic acid and the like.

The most preferred epoxide resins are glycidyl polyethers of polyhydric phenols, particularly the glycidyl polyether of bisphenol A.

The polyacrylate and polymethacrylate ester of polyols useful in this invention are those esters which contain more than one terminal acrylate or methacrylate group. These esters are the acrylic and methacrylic acid esters of aliphatic polyhydric alochols such as, for example, the di- and polyacrylates and the di- and polymethacrylates of alkylene glycols, alkoxylene glycols, alicyctic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethyacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are 1,6-hexanediol diacrylate, trimethylolpropane triacrylate, pentaerythritol triacrylate, and pentaerythritol tetraacylate.

Additional acrylate or methacrylate esters of polyols are the acrylate or methacrylate esters of epoxide resins, wherein epoxide resins as used herein are considered to be polyols. The epoxide resins useful in reacting with acrylic or methacylic acid are those epoxide resins described hereinbefore. The procedures for preparing these acrylate and methacrylate esters of epoxide resins is described in U.S. Pat. No. 3,377,406 which is hereby incorporated by reference.

The acrylate or methacrylate esters of the polyols are blended with the epoxide resins in the weight ratio of about 5 to about 100 parts of ester for each 100 parts of epoxide resin.

The preferred curing agents for the compositions of this invention are aliphatic polyamines having at least 3 active amine hydrogen atoms per molecule. Examples of such amines are the polyalkylene polyamines, e.g., diethylene/triamine, triethylene/tetraamine, tetraethylene/pentamine and pentaethylene/hexamine. Additional useful amines are ethylene diamine, tetramethylene diamine, hexamethylene diamine, xylylene diamine, and the like. Adducts of such amines with acrylonitrile, acrylic acid, ethyl acryate and the like are also useful if the adduct contains at least three active amine hydrogen atoms. Also included as useful amines are amindoamines obtained by reacting polyamines with fatty acids, both monomers and dimers, provided or course that the resulting amidoamine contains at least 3 active amine hydrogen atoms per molecule.

Additional curing agents which can be used with the compositions of this invention include aromatic amines, mercaptans and anhydrides although generally soft, low strength thermoset resins are obtained.

The polyamine is utilized with the polyepoxide resin/polyacrylate or polymethacrylate blend in approximate equivalent ratios, i.e., about 0.75 to about 1.25 amine hydrogen equivalents for each epoxy group in the epoxide resin and each acrylic unsaturated group in the ester. The amine groups react with the epoxide groups opening the epoxide ring to form a substituted amine group and a hydroxyl group. The amine groups add across the double bond of the acrylate group through Michael addition to form substituted amine groups and a saturated carbon to carbon linkages.

The compositions of the instant invention can be compounded with various fillers, reinforcing agents, dies, pigments and other additives depending upon the end use and desired properties. The compositions can be dissolved in and used from solvents, e.g., aromatic hydrocarbons, ethers, ether-esters, ether-alcohols, esters, alcohols, ketones and the like. However, because of their low viscosity, these compositions are particularly adaptable to being used with no solvents, i.e., at 100% solids.

The composition of this invention find utility wherever epoxide resins are generally used, i.e., as coatings, adhesives, castings, moldings, encapsulations and the like. Of particular interest are uses of the compositions at temperatures below 50° F., down to about 32° F. Specific applications for these compositions are rapid set adhesives and patching compounds capable of satisfactory use at application temperatures of 32° F., two-component spray applied traffic striping, wear resistant surfacing and clear sealers.

In the following examples, all parts and percentages are parts and percentages by weight unless otherwise specified.

EXAMPLE 1

To 60 parts of the diglycidyl ether of bisphenol A having an epoxide equivalent weight of 190 and a viscosity of 12,000 cps. at 25° C. were blended 40 parts 1,6-hexanediol diacrylate. The resulting blend had a viscosity at 25° C. of 100 cps., a weight per gallon of 9.19 lbs. and a Gardner color of 1. To the blend (100 parts) were added 16 parts of triethylene tetraamine. The gel time after mixing in the curing agent for a 100-gm. mass was 13 minutes with the peak exothermic temperature being 173° C.

Castings were prepared from the blend of epoxide resin, polyacrylate ester and curing agent, and were cured for 2 weeks at 25° C. The physical properties of the castings are listed in Table I.

EXAMPLE 2

To 80 parts of the diglycidyl ether of bisphenol A described in Example 1 were blended 20 parts of 1,6-hexanediol diacylate. The resulting blend had a viscosity of 610 cps. at 25° C. To the blend were added 14.3 parts of triethylene tetraamine. The gel time after mixing in the curing agent was 17 minutes for a 100 gm. mass with a peak exotherm of 182° C. Castings prepared from the blend of diglycidyl ether, acylate ester and curing agent were cured for 2 weeks at room temperature. The physical properties of the castings are listed in Table I.

EXAMPLE 3

To 60 parts of the diglycidyl ether of bisphenol A described in Example 1 were blended 40 parts of trimethylolpropane triacrylate. The resulting blend had a viscosity at 25° C. of 900 cps., a Gardner color of 1 and a weight per gallon of 9.46 lbs. To the blend were added 17 parts of triethylene tetraamine. The gel time after mixing in the curing agent was 2.5 minutes for a 100 gm. mass with a peak exotherm of 188° C. Castings, prepared from the blend were cured for 2 weeks at 25° C.

The physical properties of the castings are listed in Table I.

EXAMPLE 4

To 80 parts of the diglycidyl ether described in Example 1 were added 20 parts of trimethylolpropane triacrylate. The resulting blend had a viscosity at 25° C. of 2,640 cps. To the blend were added 15 parts of triethylene tetraamine curing agent. The gel time after mixing in the curing agent was 4.5 minutes for a 100 gm. mass with a peak exotherm of 196° C. Casting prepared from the blend and curing agent were cured for 2 weeks at 25° C. The physical properties of the castings are listed in Table I.

EXAMPLE 5

Castings were prepared from the epoxide resin, acrylate ester, curing agent blend described in Example 3. These castings were cured for 16 hours at 25° C. plus 2 hours at 100° C. The physical properties of these castings are listed in Table II.

EXAMPLE 6

To 100 parts of the glycidyl polyether described in Example 1 were added 12 parts of triethylene tetraamine curing agent. The gel time after the addition of the curing agent was 31 minutes for a 100 gram mass with a peak exotherm of 229° C. Castings prepared from the glycidyl polyether and the curing agent were cured for 16 hours at 25° C. plus 2 hours at 100° C. The physical properties of these castings are lited in Table II.

Table II

| Physical Properties | Ex. 5 | Ex. 6 |
|---|---|---|
| Tensile Strength (psi) | 8,900 | 12,500 |
| Elongation at Break (%) | 4.2 | 5.3 |
| Flexural Strength (psi) | 15,000 | 20,000 |
| Initial Flexural Modulus ($10^6$ psi) | 0.41 | 0.51 |
| Compressive Strength (psi) | | |
| Ultimate | 29,000 | 35,000 |
| at Yield | 11,000 | 16,000 |
| Izod Impact (Ft.Lbs./In.Notch) | 0.69 | 0.51 |
| Hardness, Shore D | 86 | 87 |
| Heat distortion Temp. (° C) | 79 | 101 |
| Weight Loss, 24 hrs. at 150° C. (%) | 0.21 | 0.16 |
| % Absorption, 24 hrs. in: | | |
| Water | 0.17 | 0.15 |
| 5% Acetic Acid in Water | 0.57 | 0.19 |
| 5% NaOH in Water | 0.16 | 0.15 |
| Solvent (1) | 0.01 | 0.02 |
| Dielectric Constant (2) | 3.80 | 4.08 |
| Dissipation Factor (2) | 0.029 | 0.026 |
| Volume Resistivity (ohm-Cm) | $1.8(10^{16})$ | $1.8(10^{16})$ |

(1) 50% Xylene; 50% Isopropanol
(2) Determined at 100 $H_z$ and 25° C.

The above examples are meant to merely be illustrative of the instant invention. Many other variations may be made on the instant invention without departing from the scope and spirit of the instant invention.

What is claimed is:

1. A curable composition which comprises: (1) a blend of an epoxide resin containing more than one 1,2-epoxy group per molecule and a polyacrylate or polymethacrylate ester of a polyol wherein said ester contains more than one terminal acrylate or methacrylate group, the epoxide resin and the ester being present in the weight ratio of about 100 parts of epoxide resin to about 5 to about 100 parts of ester; and (2) an aliphatic polyamine curing agent containing at least 3 amine hydrogen atoms per molecule in the amount of about 0.75 to about 1.25 amine hydrogen atoms for each epoxy group of the epoxide resin and for each acrylic unsaturated group of the polyacrylate or polymethacrylate ester said amine atoms reacting with the epoxide ring and adding across the double bond of the acrylate group of the composition.

2. The composition of claim 1 wherein the epoxide resin is a glycidyl polyether or polyester having an epoxide equivalent weight of about 100 to about 2000.

3. The composition of claim 1 wherein the epoxide resin is a glycidyl polyether of a polhydric phenol having an epoxide equivalent weight of about 110 to about 500.

Table I

| Physical Properties | Ex. 1 | Ex. 2 | Ex. 3 | Ex. 4 |
|---|---|---|---|---|
| Tensile Strength (psi) | 6,200 | 10,200 | 10,000 | 10,600 |
| Elongation (at Break) (%) | 21 | 4.2 | 3.4 | 2.5 |
| Flexural Strength (psi) | 9,000 | 16,000 | 15,600 | 17,400 |
| Initial Flexural Modulus ($10^6$ psi) | 0.29 | 0.50 | 0.50 | 0.56 |
| Compressive Strength (psi) | | | | |
| Ultimate | 30,000 | 21,000 | 18,000 | 14,900 |
| at Yield | 8,400 | 13,000 | 13,000 | 14,900 |
| Izod Impart (Ft.Lbs./In.Notch) | 0.59 | 1.05 | 0.46 | 0.37 |
| Hardness, Shore D | 80 | 84 | 85 | 85 |
| Heat Distortion Temp. (° C) | 45 | 55 | 56 | 59 |
| Weight Loss, 24 hrs. at 150° C. (%) | 2.68 | 1.11 | 0.38 | 0.33 |
| % Absorption, 24 hrs. in: | | | | |
| Water | 0.29 | 0.16 | 0.15 | 0.14 |
| 5% Acetic Acid in Water | 2.31 | 0.94 | 1.31 | 1.31 |
| 5% NaOH in Water | 0.28 | 0.16 | 0.15 | 0.14 |
| Solvent (1) | 1.55 | 0.18 | 0.04 | 0.07 |
| Dielectric Constant (2) | 3.98 | 4.10 | 3.97 | 4.06 |
| Dissipation Factor (2) | 0.033 | 0.027 | 0.025 | 0.022 |
| Volume Resistivity (ohm-Cm) | $4.6(10^{15})$ | $1.9(10^{16})$ | $2.4(10^{16})$ | $2.7(10^{16})$ |

(1) 50% Xylene; 50% Isopropanol
(2) Determined at 100 $H_z$ and 25° C.

4. The composition of claim 3 wherein the expoxide resin is a glycidyl polyether of bis(4-hydroxyphenyl)-2,2-propane having an epoxide equivalent weight of about 175 to about 250.

5. The composition of claim 1 wherein the polyacrylate ester is 1,6-hexanediol diacrylate.

6. The composition of claim 1 wherein the polyacrylate ester is trimethylolpropane triacrylate.

7. The composition of claim 1 wherein the aliphatic polyamine is a polyalkylene polyamine.

8. The composition of claim 7 wherein the polyalkylene polyamine is triethylene tetraamine.

9. The cured composition obtained from the composition of claim 1.

* * * * *

UNITED STATES PATENT OFFICE
CERTIFICATE OF CORRECTION

PATENT NO. : 4,051,195
DATED : September 27, 1977
INVENTOR(S) : Wayne F. McWhorter It is certified that error appears in the above-identified patent and that said Letters Patent are hereby corrected as shown below:

Column 1, line 20, delete "to" and insert --the--
         line 22, delete "coating" and insert --coatings--
Column 2, line 57, delete "2,033,803" and insert --3,033,803--
Column 3, line 11, delete "alicytic" and insert --alicyclic--
         line 28, delete "tetraacylate" and insert --tetracrylate--
         line 33, delete "methacylic" and insert --methacrylic--
         line 46, delete the "slash" (/) between "diethylene/triamine" and "triethylene/tetraamine"
         line 47, delete the "slash" (/) between "thylene/pentamine" and "pentaethylene/hexamine"

Column 5, Table I
Opposite "5% Acetic Acid in Water", under Ex. 1, delete "0.94",
         under Ex. 2, delete "1.31" and insert --0.94--,
         under Ex. 4, insert --1.31--

Column 6, line 2, delete "lited" and insert --listed--
         line 66, delete "polhydric" and insert --polyhydric--
Column 7, line 1, delete "expoxide" and insert --epoxide--

Signed and Sealed this

Twentieth Day of December 1977

[SEAL]

Attest:

RUTH C. MASON
Attesting Officer

LUTRELLE F. PARKER
Acting Commissioner of Patents and Trademarks